United States Patent
Chowdhury et al.

(10) Patent No.: US 9,074,942 B2
(45) Date of Patent: Jul. 7, 2015

(54) ON-CHIP TEMPERATURE SENSOR

(71) Applicant: ADVANCED MICRO DEVICES, INC., Sunnyvale, CA (US)

(72) Inventors: Golam R. Chowdhury, Austin, TX (US); Arjang Hassibi, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/023,288

(22) Filed: Sep. 10, 2013

(65) Prior Publication Data

US 2014/0016669 A1   Jan. 16, 2014

Related U.S. Application Data

(63) Continuation of application No. 13/082,615, filed on Apr. 8, 2011, now Pat. No. 8,573,841.

(51) Int. Cl.
   *G01K 7/00*   (2006.01)
   *G01K 7/01*   (2006.01)

(52) U.S. Cl.
   CPC .................................. *G01K 7/01* (2013.01)

(58) Field of Classification Search
   USPC ................................................ 374/178, 170
   See application file for complete search history.

(56) References Cited

U.S. PATENT DOCUMENTS

| | | | | |
|---|---|---|---|---|
| 3,946,364 A | * | 3/1976 | Codomo et al. | 701/3 |
| 5,070,322 A | * | 12/1991 | Fujihira | 340/653 |
| 5,757,008 A | * | 5/1998 | Akagawa et al. | 250/370.08 |
| 6,851,849 B2 | * | 2/2005 | Kimura | 374/163 |
| 7,507,023 B2 | * | 3/2009 | Oyabe et al. | 374/178 |
| 8,821,012 B2 | * | 9/2014 | Wang | 374/163 |
| 2012/0257650 A1 | * | 10/2012 | Chowdhury | 374/178 |

* cited by examiner

*Primary Examiner* — Mirellys Jagan (57) ABSTRACT

A method and apparatus for determining a temperature of a semiconductor device is provided herein. One aspect of the disclosed subject matter is seen in a temperature sensing device. The temperature sensing device comprises a diode and a circuit. The diode is adapted to be reverse biased by a charging voltage applied thereto. The circuit determines a temperature of the diode based on a rate that the voltage on the diode discharges in response to the charging voltage being uncoupled from the diode.

14 Claims, 6 Drawing Sheets

ON-CHIP TEMPERATURE SENSOR

CROSS-REFERENCE TO RELATED APPLICATIONS

The present application is a divisional application of U.S. patent application Ser. No. 13/082,615 filed Apr. 8, 2011 (now U.S. Pat. No. 8,573,841).

BACKGROUND

The disclosed subject matter relates generally to an on-chip temperature sensor and, more particularly, to an on-chip temperature sensor that uses reverse bias current of a p-n diode.

Modern semiconductor devices often include millions of transistors operating at a high speed on a single semiconductor substrate or chip. Thus, on-chip power dissipation and temperature are a significant factor that increases as the population of transistors on a single chip continues to escalate. In many single-chip devices, such as processors, different locations on the chip experience different temperatures due to different levels of activities in and around these locations. Excessive heat of the chip leads to lower reliability, increased electro migration, signal integrity variation, parameters change, and even chip damage. Thus, continuous thermal monitoring by on-chip temperature sensors is used to reduce the possibility of thermal damage and to increase reliability of the semiconductor devices.

Due to the increased design complexity, density of VLSI circuits, operating speeds, and in some cases unequal temperature gradient across the chip, there needs to be many of such sensors distributed across the chip to sense the temperatures. Since these sensors do not take part in the main activities of the chip, for example, in the main computing activities of a processor, but rather, play an auxiliary role of temperature monitoring, their presence in terms of area, and power should be minimal. Technology scaling with nanometer-scale devices has brought many advantages to digital circuits, but at the same time has created many design challenges for analog circuits due to lower voltage headroom, less transistor gain due to short channel effects, increased offset and leakage. These challenges have sometimes become a motivating reason to design digitally assisted high precision mixed-signal circuits.

Various temperature sensing circuitry has been utilized in the past. For example, some designs have used a difference between the base-emitter voltages of a substrate PNP transistor (thermal diode), which is fed by two different currents. However, these sensors require high currents to produce a reasonable amount of voltage to be processed by the subsequent circuits. In some instances, these relatively small voltage need to be amplified before they are processed by precision mixed-signal circuits, for example an Analog to Digital Converter (ADC). Thus these types of sensors tend to consume more power and area. Ultra-low power temperature sensors based on sub-threshold operation of the CMOS transistors have been reported. However in deep sub-micron technologies sub-threshold leakage limits the performance of such sensors. A time-to-digital-converter based on the propagation delay of inverters or ring oscillators based sensors occupy large area and consume excessive power at the required sampling rate.

BRIEF SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a temperature sensing device. The temperature sensing device comprises a diode adapted to be selectively reverse biased by a charging voltage. A circuit is adapted to determine a temperature of the diode based on a rate that a voltage on the diode discharges in response to a decoupling of the charging voltage from the diode.

Another aspect of the disclosed subject matter is seen in a temperature sensing device. The temperature sensing device comprises a diode adapted to be selectively reverse biased by a charging voltage. A circuit is adapted to determine a temperature of the diode based on detecting a parameter related to a reverse bias current flowing through the diode in response to a decoupling of the charging voltage from the diode.

Yet another aspect of the disclosed subject matter is seen in a method for sensing temperature. The method comprises: uncoupling a charging voltage from the diode to discharge the diode; determining a rate at which the diode discharges; and determining a temperature of the diode based on the discharge rate.

Still another aspect of the disclosed subject matter is seen in a method for sensing temperature. The method comprises: uncoupling a charging voltage from the diode to discharge the diode; determining a parameter related to a reverse bias current flowing through the diode; and determining a temperature of the diode based on the determined parameter.

BRIEF DESCRIPTION OF THE SEVERAL VIEWS OF THE DRAWINGS

The disclosed subject matter will hereafter be described with reference to the accompanying drawings, wherein like reference numerals denote like elements, and.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
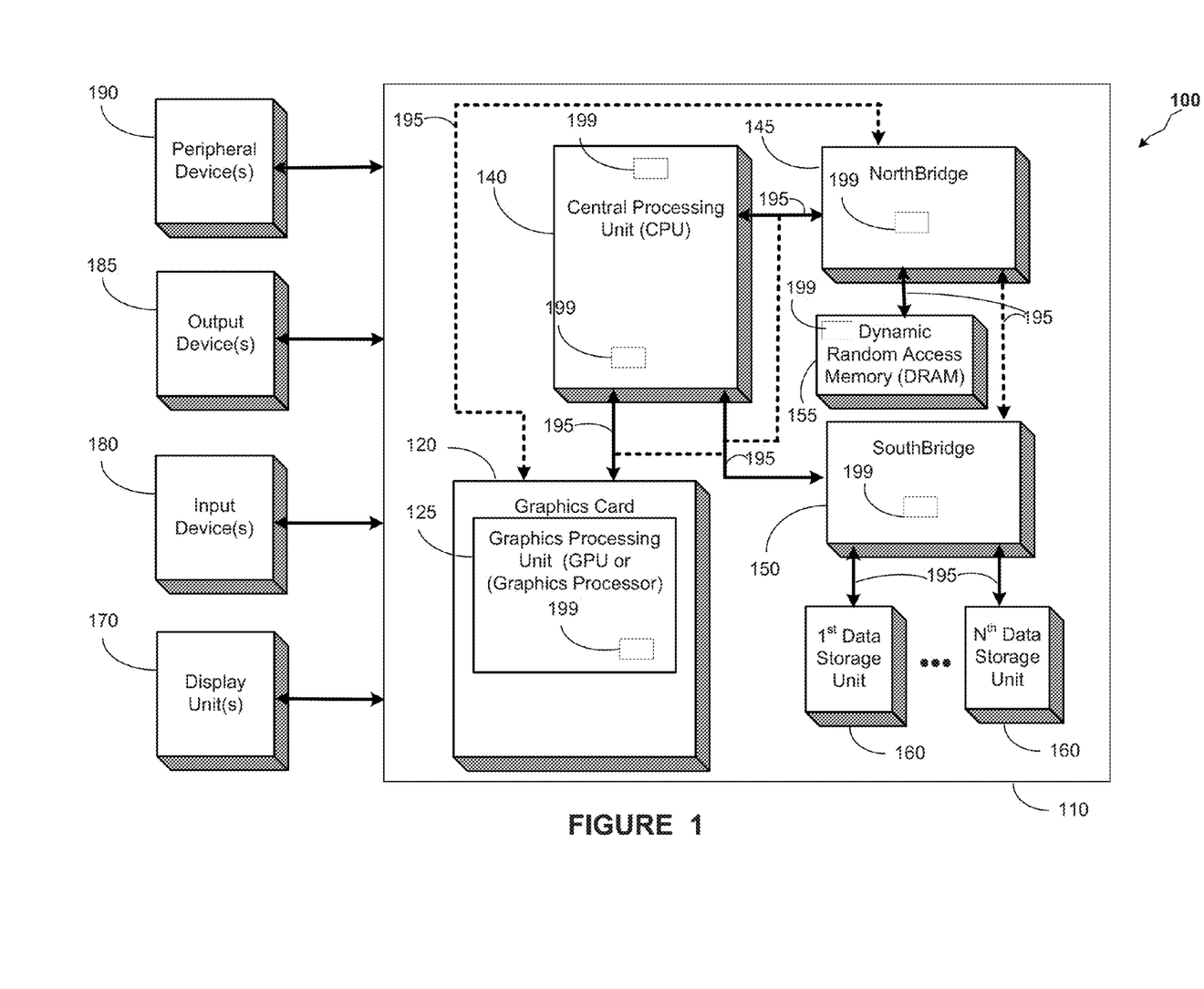
FIG. 1 is a block level diagram of a processing system comprised of a plurality of components employing one or more on-chip temperature sensors.

Referring now to the drawings wherein like reference numbers correspond to similar components throughout the several views and, specifically, referring to FIG. 1, the disclosed subject matter shall be described in the context of one or more temperature sensors 199 deployed within a semiconductor circuit, such as may be found in a processing system 100, which may include a processor, such as a central processing unit 140, a memory 155, and various other circuitry contained on one or more semiconductor substrates. Those skilled in the art will recognize that the processing system 100 may be constructed from these and other components. However, to avoid obfuscating the instant invention, only those components useful to an understanding of the present invention are included.

Turning now to FIG. 1, a block diagram of the exemplary processing system 100, in accordance with an embodiment of the present invention, is illustrated. In various embodiments, the processing system 100 may be a personal computer, a laptop computer, a handheld computer, a netbook computer, a tablet computer, a mobile device, a telephone, a personal data assistant (PDA), a server, a mainframe, a work terminal, or the like. The processing system 100 includes a main structure 110, which may be a computer motherboard, system-on-a-chip, circuit board or printed circuit board, a desktop computer enclosure and/or tower, a laptop computer base, a server enclosure, part of a mobile device, personal data assistant (PDA), or the like. In one embodiment, the main structure 110 includes a graphics card 120. The graphics card 120 may be a Radeon™ graphics card from Advanced Micro Devices ("AMD") or any other graphics card using memory, in alternate embodiments. The graphics card 120 may, in different embodiments, be connected on a Peripheral Component Interconnect (PCI) Bus (not shown), PCI-Express Bus (not shown) an Accelerated Graphics Port (AGP) Bus (also not shown), or any other connection known in the art. It should be noted that embodiments of the present invention are not limited by the connectivity of the graphics card 120 to the main structure 110. In one embodiment, the processing system 100 runs an operating system such as Linux, Unix, Windows, Mac OS, or the like.

In one embodiment, the graphics card 120 may contain a processor such as the graphics processing unit (GPU) 125 used in processing graphics data. In various embodiments the graphics card 120 may be referred to as a circuit board or a printed circuit board or a daughter card or the like.

In one embodiment, the processing system 100 includes a processor, such as a central processing unit (CPU) 140, which is connected to a northbridge 145. The CPU 140 and the northbridge 145 may be housed on the motherboard (not shown) or some other structure of the computer system 100. It is contemplated that in certain embodiments, the graphics card 120 may be coupled to the CPU 140 via the northbridge 145 or some other connection as is known in the art. For example, the CPU 140, the northbridge 145, and the GPU 125 may be included in a single processor, a single package or as part of a single die or "chip." Alternative embodiments, which may alter the arrangement of various components illustrated as forming part of main structure 110, are also contemplated. In certain embodiments, the northbridge 145 may be coupled to a system RAM (or DRAM) 155; in other embodiments, the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and the southbridge 150 may be on the same chip in the processing system 100, or the northbridge 145 and the southbridge 150 may be on different chips. In various embodiments, the southbridge 150 may be connected to one or more data storage units 160. The data storage units 160 may be hard drives, solid state drives, magnetic tape, or any other writable media used for storing data. In various embodiments, the CPU 140, the northbridge 145, the southbridge 150, the graphics processing unit 125, and/or the DRAM 155 may be a computer chip or a silicon-based computer chip, or may be part of a computer chip or a silicon-based computer chip. In one or more embodiments, the various components of the processing system 100 may be operatively, electrically and/or physically connected or linked with a bus 195 or more than one bus 195.

In different embodiments, the processing system 100 may be connected to one or more display units 170, input devices 180, output devices 185, and/or peripheral devices 190. It is contemplated that in various embodiments, these elements may be internal or external to the processing system 100, and may be wired or wirelessly connected, without affecting the scope of the embodiments of the present invention. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to physical digital media, a USB device, Zip Drive, external floppy drive, external hard drive, phone and/or broadband modem, router/gateway, access point and/or the like. To the extent certain exemplary aspects of the processing system 100 are not described herein, such exemplary aspects may or may not be included in various embodiments without limiting the spirit and scope of the embodiments of the present invention as would be understood by one of skill in the art.

Those skilled in the art will appreciate that the various components shown within or coupled to the processing system 100 may benefit from temperature sensing at one or more locations on the semiconductor chips contained therein. For example, the CPU 140, GPU, 125, DRAM 155, Northbridge 145 and Southbridge 150 are diagrammatically illustrated as having a plurality of on-chip temperature sensors 199 contained therein. Further, each of the CPU 140, GPU 125, DRAM 155, Northbridge 145 and Southbridge 150 may include more than one on-chip temperature sensor 199 positioned at various locations on each of the chips contained in each of the devices so as to allow the temperature of each of the devices to be monitored at a plurality of locations.

Figure 2:
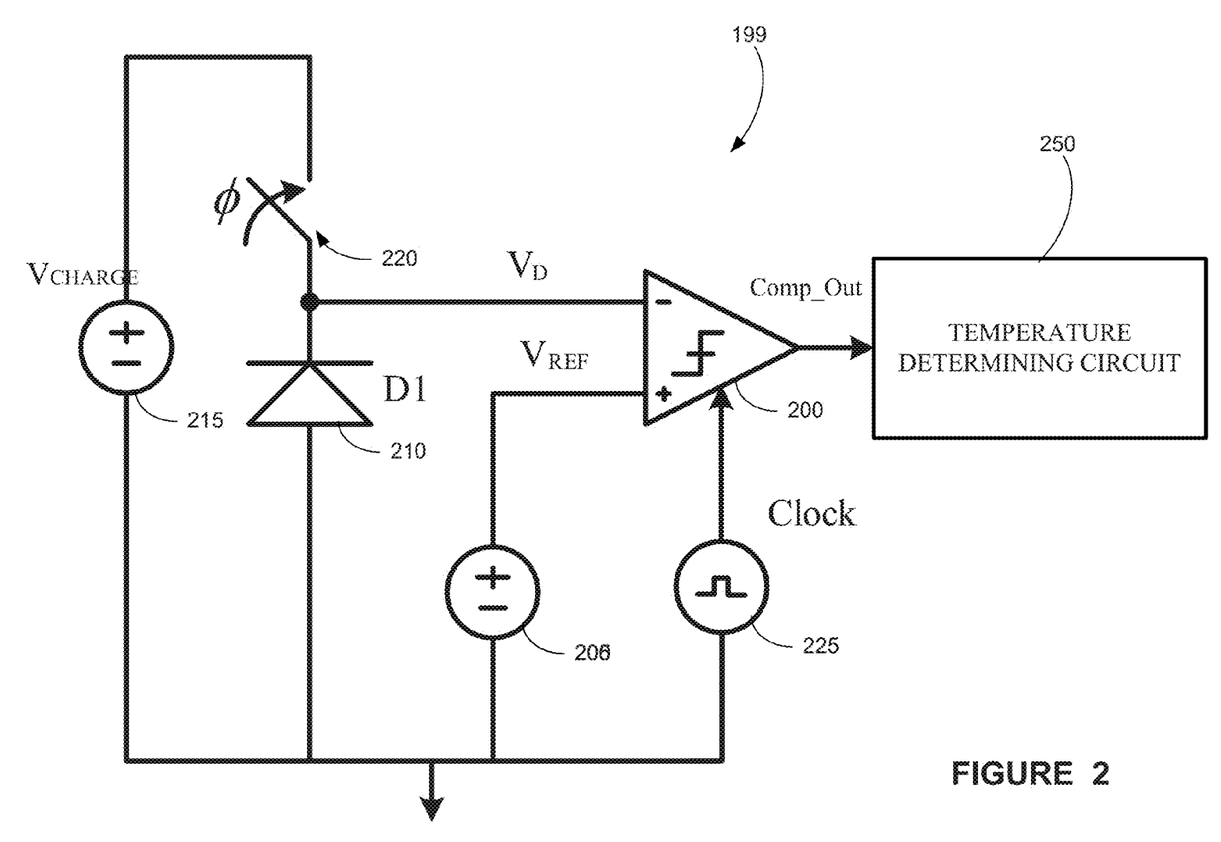
FIG. 2 is a simplified block diagram of an exemplary on-chip temperature sensor that is part of the microprocessor and external memory of FIG. 1.

Turning now to FIG. 2, a block diagram of an exemplary embodiment of the on-chip temperature sensor 199 is shown. Generally, the on-chip temperature sensor 199 operates to determine temperature of an area adjacent a diode 210 based on the magnitude of the reverse bias current $I_D$ of the diode 210. Those skilled in the art will appreciate that the magnitude of the reverse bias current $I_D$ may be measured directly by actually monitoring the current flowing through the diode 210, or indirectly by monitoring a parameter associated with the reverse bias current $I_D$, such as a voltage $V_D$ appearing at a terminal of the diode 210. One embodiment of the on-chip temperature sensor 199 that monitors $V_D$ is described in conjunction with FIG. 2.

A comparator 200 has a non-inverting input coupled to a reference voltage 205 $V_{REF}$, and an inverting input coupled to the reverse-biased diode 210 $V_D$. Those skilled in the art will appreciate that the output level of the comparator 200 will transition to a low level when the voltage $V_D$ exceeds the reference voltage $V_{REF}$, but will pass a clock input 225 when $V_D$ falls below the reference voltage $V_{REF}$.

In one embodiment of the instant invention, the reference voltage $V_{REF}$ 205 is set to a desired level below that of the voltage drop $V_D$ of the reverse-biased diode 210. A voltage source 215 $V_{CHARGE}$ may be selectively coupled to the diode 210 via a switch 220 that may be controllably opened and closed for a selected period of time based on a timing signal Φ to cause the diode 210 to be reverse-biased to a voltage, in this case $V_D = V_{CHARGE}$. During the period of time when the switch 220 is not closed (as caused by the timing signal Φ), then the voltage drop across the diode $V_D$ will discharge through the reverse-bias current of the diode 210. Those skilled in the art will appreciate that the discharge rate is a function the temperature of the diode 210. Thus, the time period over which $V_D$ discharges to $V_{REF}$ is related to the temperature of the semiconductor device surrounding the diode 210.

Figure 3:
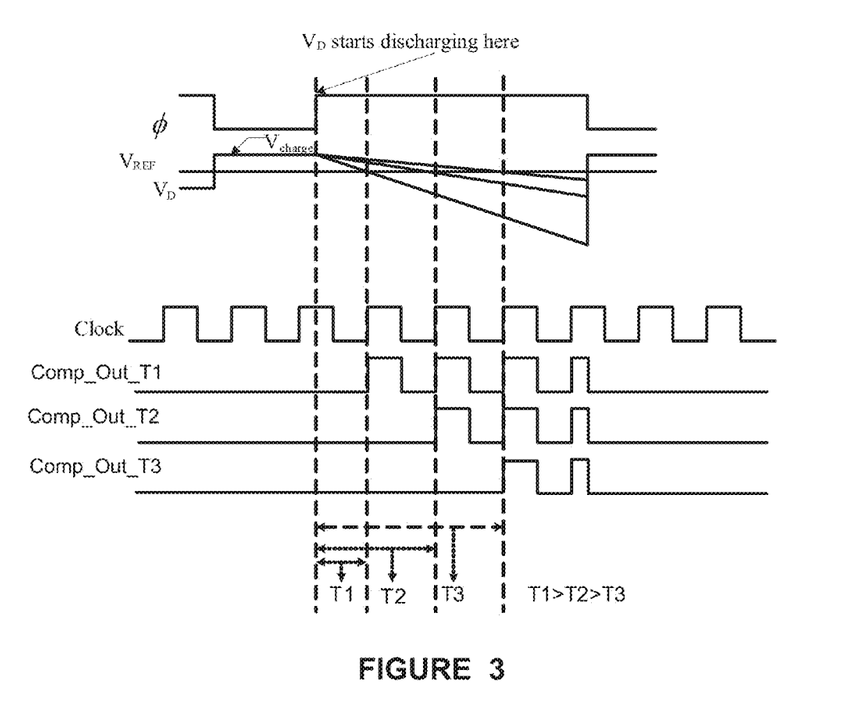
FIG. 3 is a timing diagram illustrating an exemplary operation of the various components of the on-chip temperature sensors shown in FIGS. 1 and 2.

Operation of the on-chip temperature sensor 199 may be appreciated by simultaneous reference to the block diagram of FIG. 2 and a timing diagram contained in FIG. 3. The timing diagram shows the switch 220 being closed by the timing signal Φ transitioning from a high to a low state. During this time period, the voltage source 215 is coupled across the diode 210, which causes the diode 210 to be reverse-biased at the preselected Voltage $V_{CHARGE}$ ($V_D$). Since $V_D$ exceeds $V_{REF}$, the output (Comp_Out) of the comparator 200 is low throughout the period of time that the timing signal Φ is also low. When the timing signal Φ transitions to a high level, the switch 220 is opened, removing $V_{CHARGE}$ from the diode 210. Without $V_{CHARGE}$, the diode 210 begins to discharge at a rate related to the temperature of the diode 210.

In the timing diagram of FIG. 3, three scenarios are illustrated, each scenario being related to a different temperature of the diode 210. For example, T1 represents a relatively high temperature, which induces the diode 210 to discharge relatively quickly. T2 represents a moderate temperature, which induces the diode 210 to discharge at a more moderate rate. T3 represents a relatively low temperature, which induces the diode 210 to discharge at a slow rate. Thus, the output signal from the comparator 200 begins passing the clock signal after $V_D$ crosses $V_{REF}$.

The temperature of the diode 210 may be readily determined by a temperature determining circuit 250 by measuring the period of time between the timing signal Φ transitioning to a high level and when the output of the comparator 200 begins to pass the clock signal, that is by measuring the delay between the rising edge of Φ and the first rising edge of the comparator output. Another methodology for determining this period of time involves counting the number of clock cycles that occur between the timing signal Φ transitioning to a high state and then to the next low state. The count is related to the temperature of the diode 210. That is, a higher count means that $V_D$ discharged quickly because of a high temperature, allowing the comparator 200 to resume passing the clock signal sooner. Conversely, a lower count means that $V_D$ discharged more slowly because of a relatively lower temperature, allowing the comparator 200 to resume passing the clock signal later. One exemplary embodiment of the temperature determining circuit 250 is shown and described below in greater detail in conjunction with FIG. 7.

Those skilled in the art will appreciate that other methodologies may be employed to determine the rate at which the diode 200 discharges via the reverse bias current without departing from the spirit and scope of the instant invention. For example, a counter (not shown) may be employed to count clock pulses that occur between the rising edge of Φ and the first rising edge of the comparator output. The count may then be related to the temperature of the diode 200, as it will be proportional to the reverse bias current of the diode 200.

Figure 4:
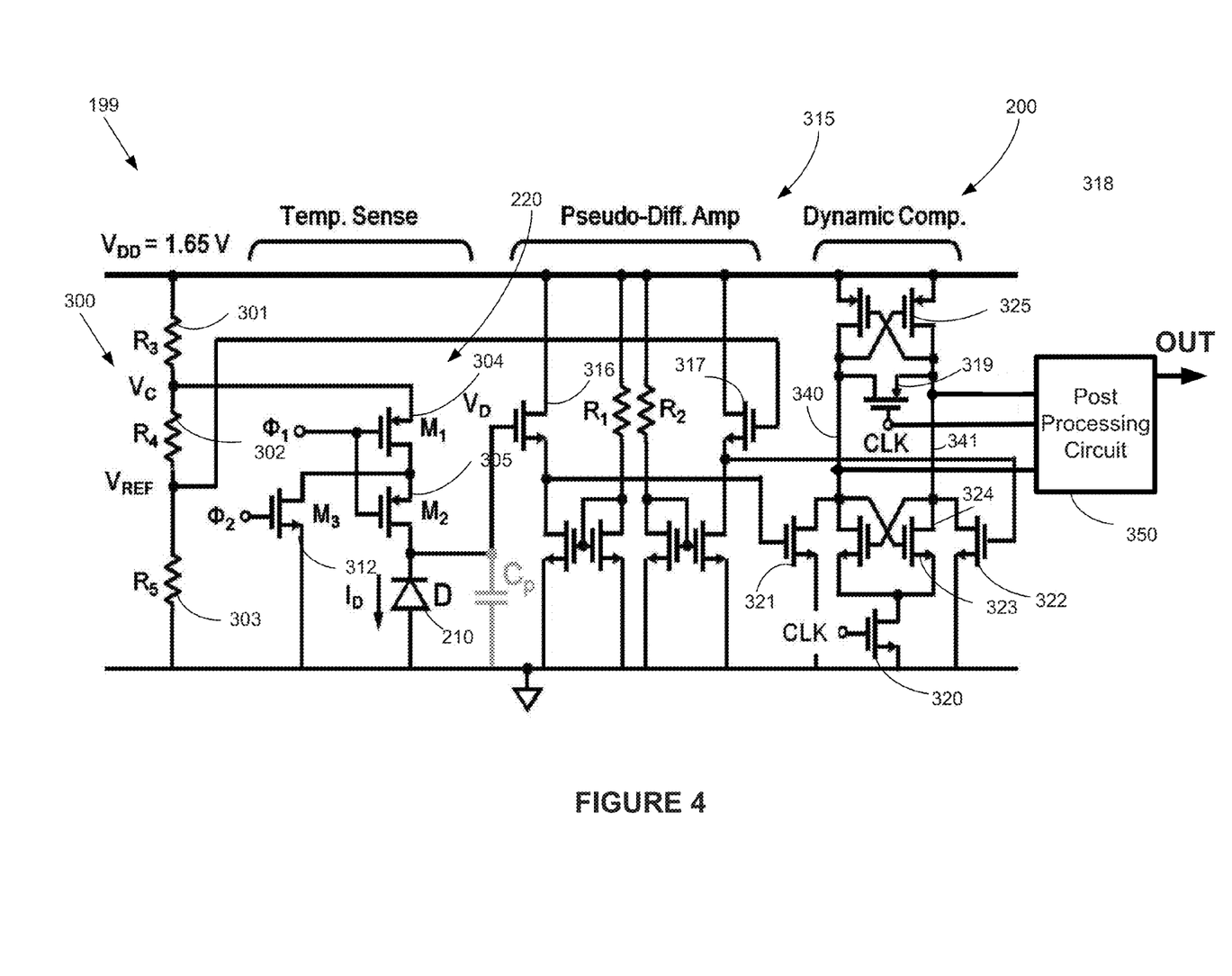
FIG. 4 is a schematic diagram of one embodiment of the on-chip temperature sensors shown in FIGS. 1 and 2.
Figure 5:
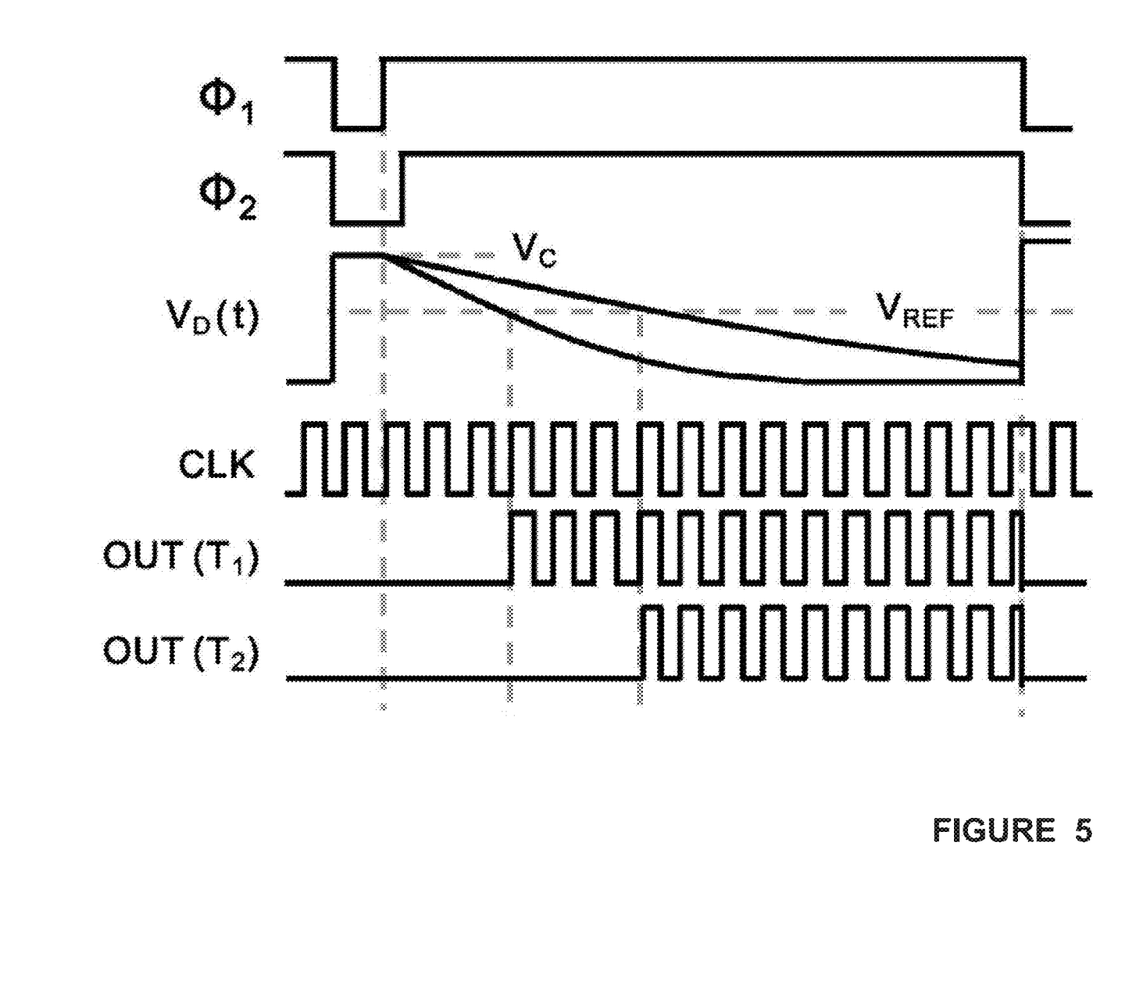
FIG. 5 is a timing diagram illustrating an exemplary operation of the various components of the on-chip temperature sensor shown in FIG. 4.

Turning now to FIG. 4, a transistor level schematic of one embodiment of the on-chip temperature sensor 199 is shown. FIG. 5 illustrates a timing diagram that may be useful in understanding the operation of the circuitry described by FIG. 4. In this embodiment, the reference and charge voltages $V_{Ref}$ and $V_C$ are derived from an available on-chip power supply $V_{DD}$ via a resistor divider 300 comprised of three serially coupled resistors 301, 302, 303. This makes the temperature sensor output substantially insensitive to power supply. The voltage $V_C$ is coupled through the switch 220 to the diode 210. The switch 220 is comprised of two transistors 304, 305 coupled in series and each having a control input coupled to receive the timing signal Φ1. Thus, as shown in the timing diagram of FIG. 5, when the timing signal Φ1 transitions to a low level, both of the transistors 304, 305 are biased on and $V_{Charge}$ reverse biases the diode 210. Subsequently, the timing signal Φ1 transitions to a high level, and both of the transistors 304, 305 are biased off, allowing the voltage $V_D$ at the diode 210 to begin discharging via the reverse bias current $I_D$ of the diode 210.

As can be seen from the timing diagram of FIG. 5, the timing signal Φ2 subsequently also transitions to a high level and biases a transistor 312 on, providing a path to ground for any leakage from $V_{DD}$ through the transistor 312. By appropriate device sizing, the leakage currents of the transistors 304 and 305, are made to be negligible compared to $I_D$. Hence, the discharge rate of $V_D$ is substantially independent of transistor leakage and is substantially only a function of $I_D$.

A conventional pseudo-differential amplifier or buffer 315 is coupled between the discharge node of the diode 210 and the comparator 200. The pseudo-differential amplifier 315 is useful to attenuate kick-back from the comparator 200 into the sensing node of the diode 210; however, those skilled in the art will appreciate that the pseudo-differential amplifier 315 is not a necessary component to the on-chip temperature sensor 199. Generally, a pair of transistors 316, 317 have control inputs coupled to receive $V_D$ and $V_{Ref}$, respectively. The drains of the transistors 316, 317 are coupled to the inverting and non-inverting inputs of the comparator 200, respectively, which in the illustrated embodiment takes the form of a dynamic comparator 318.

The dynamic comparator 318 operates to compare the voltages $V_D$ and $V_{Ref}$, which are coupled to the control inputs of transistors 321, 322, respectively. Generally, the dynamic comparator 318 provides a low output signal when $V_D$ is greater than $V_{Ref}$ and provides a clock signal when $V_D$ is less than or equal to $V_{Ref}$. The dynamic comparator 318 has a clock input (CLK) coupled to a control input of transistors 319, 320, which are PNP and NPN transistors, respectively. Thus, when the clock signal is low, the transistor 319 is biased on and the transistor 320 is biased off. Alternatively, when the clock signal transitions to a high value, then the transistor 319 is biased off and the transistor 320 is biased on. When the clock signal is low and the transistor 319 is biased on, the two legs 340, 341 of the dynamic comparator 318 are substantially shorted together. A post processing circuit 350 is coupled to both legs 340, 341 and also receives the clock signal. The post processing circuit 350 operates to insure that the output signal OUT is low when the clock signal is also low.

The dynamic comparator 318 is free to compare the voltages $V_D$ and $V_{Ref}$, when the clock signal is high. If $V_D$ is greater than $V_{Ref}$ at that time, then more currents flows through the transistor 321 compared to the transistor 322. Thus an imbalance of currents will start flowing out of the nodes 340 and 341 towards ground through the transistor 320, initiating a positive feedback regenerative action through the cross-coupled pairs of PMOS and NMOS transistors 323, 325. As a result, the final output OUT will quickly reach a low value.

Alternatively, if $V_{Ref}$ is greater than $V_D$ at that time, then more current flows through the transistor 322 than the transistor 321, which will set an imbalance of currents flowing out of the nodes 340 and 341 in the opposite direction, and the positive feedback regenerative action will bias the output signal OUT to a high value. Thus, when the clock signal of the dynamic comparator 318 is low, then the output signal OUT is low regardless of the values of $V_D$ and $V_{Ref}$. However, when the clock signal is high, then the output of the comparator 318 will continue to be low if $V_{Ref}$ is smaller than $V_D$, but then the output will follow the clock (CLK) as long as $V_D$ is smaller than $V_{Ref}$. At the end of charging period when Φ1 starts going high, the diode 210 starts discharging from its initial voltage $V_D$. At this time, $V_D$ is greater than $V_{Ref}$ and thus the comparator output (OUT) will be at low state. The diode voltage $V_D$ continues discharging at a rate determined by the reverse-bias current of the diode (which in turn depends on the temperature of the diode) and when $V_D$ crosses $V_{Ref}$, the comparator 200 output flips to a high value. Thus, depending on the temperature, the final output of the comparator will switch to the high state sooner or earlier. A higher temperature will cause the output of the comparator 200 to transition to a high value sooner, whereas a lower temperature will cause the output of the comparator 200 to transition to a high value later.

Two exemplary curves are shown in FIG. 5, representing two different temperatures (T1>T2) for the diode 210. The two different temperatures T1, T2 result in two different output signals from the dynamic comparator 318, which are the digital representations of the temperatures of the diode 210.

Those skilled in the art will appreciate that, for a constant ID, VD(t) can be formulated by the following equation:

$$V_D(t) = \alpha V_{DD}(1 - t \cdot I_D / C_p)$$

where, α is a constant and a function of resistor divider 300, and Cp is the total capacitance at the diode discharge node. Now, since $V_{REF}$ is also a linear function of $V_{DD}$, solving $V_D(t) = V_{REF}$ results in a temperature $T_D$ independent of $V_{DD}$. This, to first-order, ensures that the output of this temperature sensor 199 stays insensitive to $V_{DD}$ variations.

Figure 6:
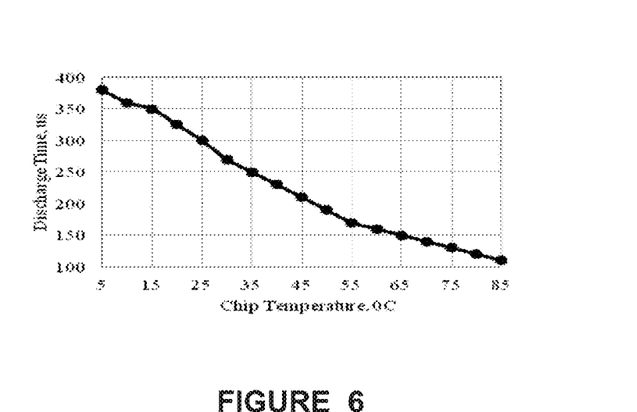
FIG. 6 is a graphical representation of discharge time versus temperature for an exemplary diode used in the on-chip temperature sensor of FIGS. 1, 2, and 4.
Figure 7:
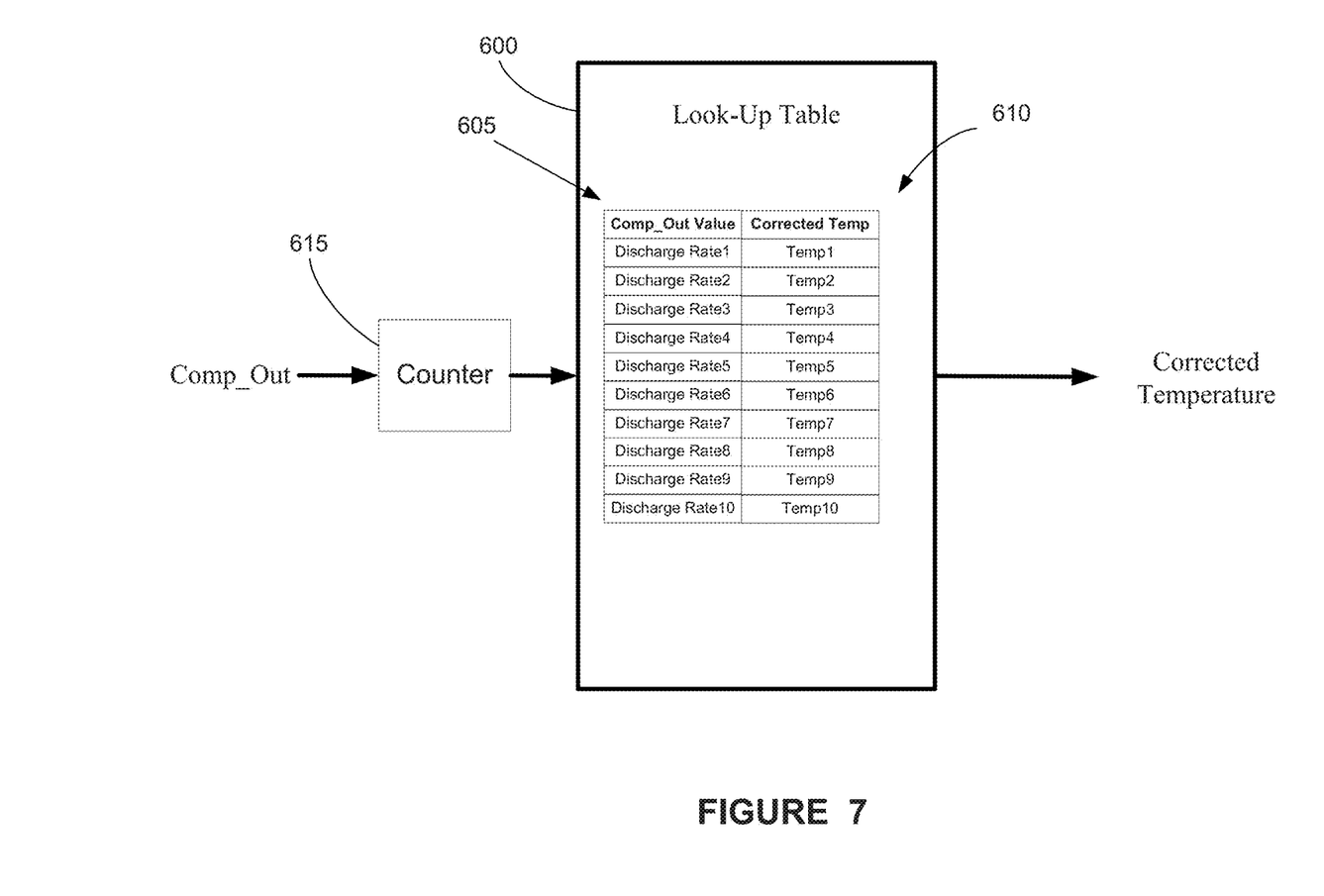
FIG. 7 is a block diagram of an exemplary embodiment of a correction circuit that may be utilized with the on-chip temperature sensor of FIGS. 1, 2, and 4.

As can be seen by the graph in FIG. 6, the discharge time of the diode 210 is a nonlinear function of temperature. To resolve this nonlinearity, curvature calibration may be used to compensate for the combined offsets of the pseudo-differential amplifier 315 and the dynamic comparator 318. In some embodiments of the instant invention, it may be useful to apply a correction factor to the output signals received from the dynamic comparator 318 to compensate for any nonlinearity in the output signal. Those skilled in the art will appreciate that correction factors may be implemented in hardware, software, firmware, or a combination thereof. In one exemplary embodiment, such as is shown in FIG. 7, the output signal (Comp_Out) of the dynamic comparator 318 may be used to access a look-up table 600 that correlates the discharge rate of the diode 210 to a corrected temperature. In one embodiment, the Comp_Out signal is delivered to a counter 615. The look-up table 600 may be constructed to use the value of the Counter 615 signal as a pointer into the look-up table 600, which has a plurality of discharge rates 605, each associated with a corrected temperature 610. Thus, by populating the look-up table 600 with values that more precisely represent the non-linear relationship between temperature and the discharge rate of the diode 210 (such as is illustrated in the graph of FIG. 6), a more precise temperature may be derived from the on-chip temperature sensor 199. Those skilled in the art will appreciate that the counter 615 and look-up table 600 may also be located on-chip with the temperature sensor 199, or may be located external to the chip.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A temperature sensing device, comprising:
   a diode adapted to be selectively reverse biased by a charging voltage; and
   a circuit adapted to determine a temperature of the diode based on detecting a parameter related to a reverse bias current flowing through the diode in response to a decoupling of the charging voltage from the diode, wherein the circuit comprises:
   a dynamic comparator comprising a first input terminal coupled to the diode, a second input terminal coupled to receive a reference voltage, a third input terminal coupled to receive a clock signal, and an output to provide an output signal based on a comparison of a voltage at the diode and the reference voltage and responsive to the clock signal.

2. A temperature sensing device, as set forth in claim 1, further comprising a curvature calibration circuit adapted to correct for at least one non-linearity in a relationship between the determined parameter and the temperature of the diode.

3. A temperature sensing device, as set forth in claim 2, wherein the curvature calibration circuit comprises a look-up table correlating at least one parameter to at least one corrected diode temperature.

4. A temperature sensing device, as set forth in claim 1, wherein the output of the dynamic comparator is to provide as the output signal a clock signal based on the received clock signal in response to the voltage at the diode being less than the reference voltage.

5. A temperature sensing device, as set forth in claim 4, further comprising:
   a counter coupled to the output of the dynamic comparator; and
   a look-up table correlating at least one count of the counter to at least one corresponding temperature of the diode, wherein the look-up table corrects for at least one non-linearity in a relationship between the determined parameter and the temperature of the diode.

6. A temperature sensing device, as set forth in claim 4, further comprising a power supply to supply the charging voltage and the reference voltage from a common voltage.

7. A method for sensing temperature, comprising:
   removing a charging voltage from a diode to discharge the diode;
   determining a parameter related to a reverse bias current flowing through the diode; and
   determining a temperature of the diode based on the determined parameter and a correction for at least one non-linearity in a relationship between the determined parameter and the temperature of the diode.

8. A method, as set forth in claim 7, wherein determining a parameter related to a reverse bias current flowing through the diode further comprises determining the reverse bias current.

9. A method, as set forth in claim 7, wherein determining a parameter related to a reverse bias current flowing through the diode further comprises determining a rate at which a voltage on the diode discharges.

10. A method, as set forth in claim 9, wherein determining the rate at which the voltage on the diode discharges comprises determining the rate at which the voltage on the diode discharges using a dynamic comparator.

11. A method, as set forth in claim 7, wherein the correction for at least one non-linearity includes a look-up table that correlates at least one parameter to at least one corrected diode temperature.

12. A method, as set forth in claim 11, wherein the parameter comprises a discharge rate of the diode after the charging voltage is removed.

13. A method, as set forth in claim 7, wherein determining a temperature of a diode comprises determining the temperature of the diode based on a period of time related to a time elapsed between the charging voltage being uncoupled from the diode and a time at which the voltage on the diode reaches a preselected reference voltage.

14. A method, as set forth in claim 13, further comprising providing the charging voltage and the reference voltage from a common voltage.

* * * * *